US006352291B1

(12) United States Patent
Tortajada

(10) Patent No.: US 6,352,291 B1
(45) Date of Patent: Mar. 5, 2002

(54) IMPLEMENT AND SYSTEM FOR REMOTELY AFFIXING AND REMOVING DECORATIONS AND OTHER OBJECTS

(76) Inventor: Michael Vincent Tortajada, 424 Patton Ave., Piscataway, NJ (US) 08854

( * ) Notice: Subject to any disclaimer, the term of this patent is extended or adjusted under 35 U.S.C. 154(b) by 0 days.

(21) Appl. No.: 09/590,153

(22) Filed: Jun. 8, 2000

(51) Int. Cl.[7] .................................................. B25J 1/04

(52) U.S. Cl. ........................................ 294/24; 294/19.1

(58) Field of Search ........................... 294/19.1, 24, 26, 294/22, 23; D8/14; 248/304; 362/396

(56) References Cited

U.S. PATENT DOCUMENTS

| | | | | | |
|---|---|---|---|---|---|
| 40,271 | A | * 10/1863 | Lilley | 294/19.1 |
| 103,627 | A | * 5/1870 | Lamb | 294/24 |
| 785,774 | A | * 3/1905 | Strehlow | 294/19.1 |
| 3,048,139 | A | * 8/1962 | Duckett | 294/19.1 |
| 3,820,195 | A | * 6/1974 | Hutzell | 294/85 |
| 3,936,088 | A | * 2/1976 | Williams | 294/19.1 |
| 4,469,361 | A | * 9/1984 | Pendergraft | 294/19.1 |
| 4,934,089 | A | * 6/1990 | Samar | 294/19.1 |
| 4,979,712 | A | * 12/1990 | Rios | 248/304 |
| 5,190,331 | A | * 3/1993 | Corbin | 294/24 |
| 5,509,632 | A | * 4/1996 | Mesna et al. | 248/304 |
| 5,553,823 | A | * 9/1996 | Protz, Jr. | 248/304 |
| 5,560,975 | A | * 10/1996 | Casper | 428/99 |
| 5,566,058 | A | * 10/1996 | Protz, Jr. | 362/396 |
| 5,575,446 | A | * 11/1996 | Swenson et al. | 248/304 |
| 5,667,174 | A | * 9/1997 | Adams | 248/156 |
| 5,868,334 | A | * 2/1999 | Cedillo | 242/405.3 |
| D414,390 | S | * 9/1999 | Sarver | D8/14 |
| 5,964,489 | A | * 10/1999 | Mahoney | 294/24 |

* cited by examiner

*Primary Examiner*—Eileen D. Lillis
*Assistant Examiner*—Paul T. Chin
(74) *Attorney, Agent, or Firm*—Salzman & Levy

(57) ABSTRACT

An article for affixing and removing a strand of lights or other decorations to and from a particular place and a method for quickly and safely performing those tasks. For example, the strand of lights can be positioned on a roof, a gutter, a tree, etc. An elongated positioning implement has a substantially U-shaped distal end for receiving and holding a wire or light strand. A dividing post can also be attached to the distal end, or integral to it, located between the fingers of the U-shape. A downwardly oriented finger can also be attached to a portion of the U-shaped distal end. Additionally, a temporary hanger may be used in conjunction with the positioning implement. In such case the temporary hanger may be put in place on a fixed object, such as a gutter on a building, using the positioning implement. Once in place, the temporary hanger can provide a convenient member for hanging a decorative article, such as a strand of lights. The positioning implement is used to affix the decorative article by placing it on the temporary hanger. The positioning implement can also be used to remove both the decorative article and the temporary hook simultaneously.

8 Claims, 7 Drawing Sheets

IMPLEMENT AND SYSTEM FOR REMOTELY AFFIXING AND REMOVING DECORATIONS AND OTHER OBJECTS

FIELD OF THE INVENTION

The present invention relates to the placement, affixing and removal of lighting wire strands or other decorations or ornamentation in remote locations and, more particularly, to a tool for performing the aforementioned tasks.

BACKGROUND OF THE INVENTION

Some devices exist for the purpose of assisting in the placement of decorations and ornaments such as strands of electric holiday lights. Such holiday lights can be strung on structures, such as buildings, roofs, gutters and garages, as well as on shrubbery and, of course, trees.

In order to put up holiday lights, a homeowner usually uses a ladder. Unfortunately, ladders are inherently dangerous, especially when used only rarely by the homeowner and at great heights. Furthermore, most existing products for affixing lights to a residential building require one or both hands to be applied, leaving no means for balancing or safely grasping a ladder.

In addition, in the case of holiday decorating, the entire hazardous process must be repeated to remove the decorations. The difficulty of this process is compounded by the fact that in many regions holiday decorating takes place in cold and/or icy conditions.

Also, for most outdoor decorating, such as adorning residential buildings with strands of holiday lights, one often finds obstructions to placing a ladder in the necessarily adjacent position to the building. These obstructions include trees, bushes and other shrubbery as well as porches and other structures, or ground otherwise unsuitable for positioning a ladder.

Furthermore, when decorating trees, because of their conical shape, a person must lean away from the ladder to reach the tree, thereby increasing the potential for an injurious fall.

U.S. Pat. No. 5,553,905 issued to Bentivegna for ORNAMENT HANDLING APPARATUS, discloses an apparatus for handling ornaments and other objects, including an elongated handle and a hook-shaped applicator. The applicator is attached to one end of the elongated handle and a hook receiving hole extends at least partially into the applicator to hold an ornament hook therein. The apparatus may further include a retriever for removing ornaments. The apparatus may alternatively include an applicator affixed to a connector for attachment to an elongated handle, or additionally, the apparatus may be sold as a kit where the applicator and retriever are removably affixed to the elongated handle or are attached to separate connectors for attachment to the elongated handle.

U.S. Pat. No. 5,566,058 issued to Protz, Jr. for LIGHT CLIP FOR SHINGLES OR GUTTERS, discloses a light clip for holding a light bulb with an attachment portion for removably mounting the light clip to a support surface such as a shingle or gutter without putting holes in the gutters or shingles. The attachment portion has a mechanism with a plurality of discrete stop positions, and cooperates with a bulb holder having connecting prongs. The mechanism with discrete stops cooperates with the prongs to mount the bulb holder to the attachment portion and to provide a plurality of discrete angular positions of a bulb carried by the bulb holder with respect to the attachment portion. The gutter attachment portion is capable of mounting onto a variety of gutter shapes.

U.S. Pat. No. 5,868,334, issued to Cedillo for LIGHT HANGING EXTENSION DEVICE AND METHOD FOR USING SAME, discloses a device for storing and hanging a continuous string of lights on a tree. The device includes a spool assembly having first and second annular plates spaced apart and connected to a cylinder member. One of the annular plates is adapted to releasably secure an end portion of the string of lights in a fixed position. An axle structure is removably secured within a bore of the cylinder member. The axle structure has a holding mechanism releasably securing the axle structure to the cylinder member. A handle is coaxially mounted to the axle structure. An elongated pole is provided which has first and second end portions. The first end portion is removably coaxially secured to the handle. The elongated pole is sized for extending and elevating the spool assembly upwardly in close adjacency with branches of a tree when a user grasps the second end portion of the elongated pole. The spool assembly can be moved around a perimeter of the tree to enable the string of lights of be progressively strung about the tree.

U.S. Pat. No. 5,560,975 issued to Casper for DECORATING SYSTEM, discloses a decorating system that enables decorative articles to be hung from high places with safety. The decorating system comprises a dual hook and an adapter. The dual hook has a ring, a first hook, and a second hook. The decorative article is held by the second hook. The adapter is attached to the end of a pole and has a finger that is insertable into the dual hook ring, much like a carnival game. A user manipulates the pole to locate the dual hook first over a selected support member. The dual hook is lowered slightly to rest the first hook thereof on the support member. Then the adapter finger is removed from the dual hook ring. To take down the decorative article, the adapter finger is reinserted into the dual hook ring, and the pole is manipulated to lift the dual hook off the support member and return the dual hook and decorative article to the ground.

It would be advantageous, therefore, to provide an implement for allowing a user to affix and remove decorations such as holiday lights from a distance, without using a ladder.

It would be further advantageous to provide an easy to use means for installing a temporary hook, or hanger to be affixed to a fixed structure, such as a roof, branch or gutter without the need for a ladder, providing means for hanging such items as decorative holiday lights, windsocks, bird feeders and the like.

Additionally, it would be advantageous to use the positioning implement in conjunction with a hanger which may be put in place on an object using the positioning implement for temporarily affixing the hanger from which to hang the decoration, such as a strand of lights.

Another advantage for the user would be for the temporary hook item to cause no permanent damage or other lasting after effects to the fixed structure or support member.

Another advantage of such a system would be for all items put in place with the system, and such temporary hooks or hangers, to be easily removable by the user without the need for a ladder.

It would also be advantageous to provide means for a temporary hook, or hanger to become attached to the item being hung, such as a strand of holiday lights, so that, when the hanging item is removed, the temporary hook or hanger is prevented from being lost, or falling into the gutter, for example.

It would be advantageous to provide a decoration installation tool that is easy to manufacture, made from simple injection molded plastic requiring no assembly.

SUMMARY OF THE INVENTION

The primary advantages enjoyed by the user are the dramatic increases in safety, convenience and speed with which items, such as holiday decorations, can be put up and taken down compared to previous known methods.

A particular advantage of this invention is provided by the design features of the distal end. The combination of features provide both the benefits of a relatively wide U-shaped opening for grabbing items, such as a strand of wire, and relatively narrow opening, which is useful for transferring items to another means for holding them.

In accordance with the present invention, there is provided an article for affixing and removing a strand of lights to and from a particular place. For example, the light strand can be positioned on a roof, a gutter, a tree, etc. An elongated positioning implement has a substantially U-shaped distal end for receiving and holding a wire or light strand. A dividing post can also be attached to the distal end, or integral to it, located between the distally oriented fingers of the U-shape. A finger can also be attached to a portion of the U-shaped distal end.

In its most simple form, the method for affixing and removing holiday light strands and the like (bird feeders, wind socks, wind chimes, ornaments) from high places utilizes the aforementioned implement for positioning same in conjunction with a relatively permanently fixed hook, rod, branch, post or any fixed protrusion. In this instance, the positioning implement is used to ferry an item, such as a strand of lights, to a relatively fixed means for holding the item. The positioning implement is used to simply lift and/or later remove an item to and from a resting place. The positioning implement, with or without the aid of an elongated extension pole, allows a person to hang an object on and remove it from a high place without using a ladder.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

Generally speaking, the invention is an article for affixing and removing a string of lights to and from a particular place. For example, a strand of lights can be positioned on a roof, a gutter, a tree, building, or beam, etc. Further, the invention comprises the use of a relatively permanent or temporarily affixable hanger and the method for affixing and removing objects from remote locations.

Figure 1:
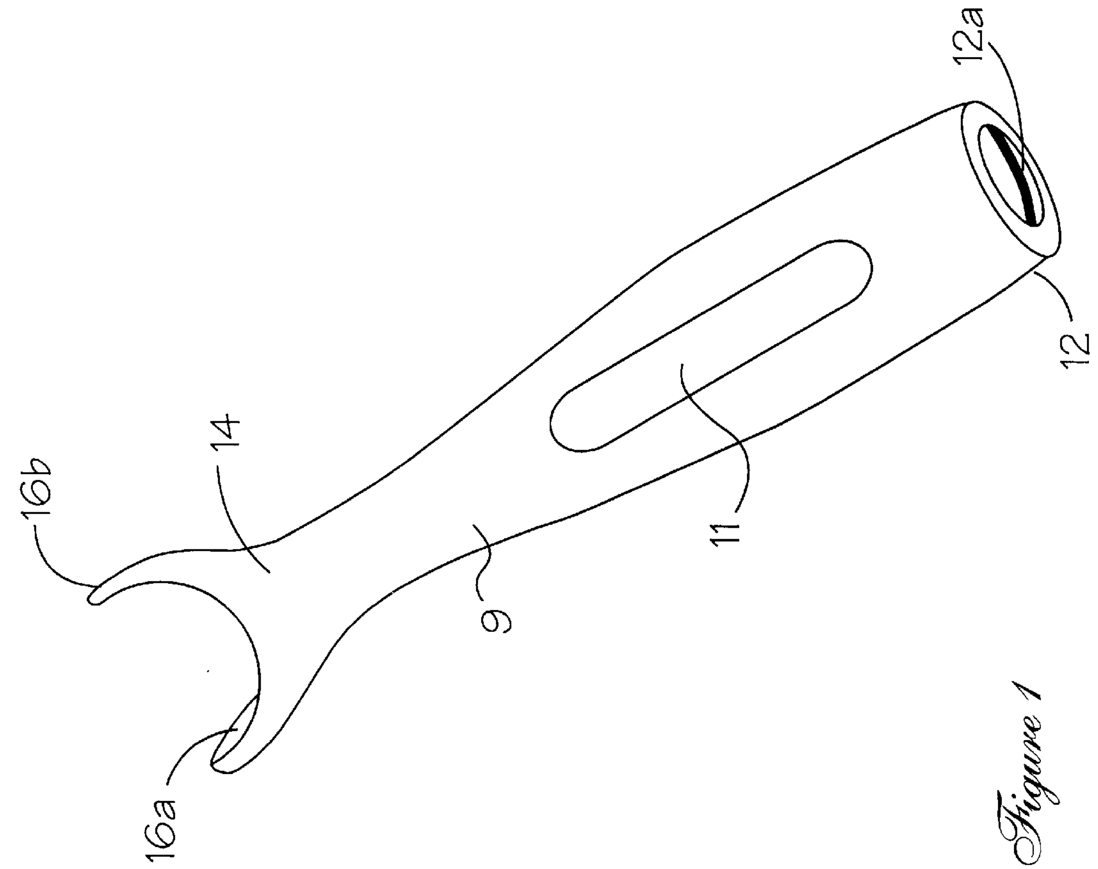
FIG. 1 is a perspective view of the article of the present invention.

Referring now to FIG. 1, there is shown a perspective view of the elongated positioning implement 9 in accordance with the invention. The implement 9 can be constructed of metal, but plastic is preferred, as it is advantageous to have an electrically non-conductive material, since wire strands pose potential electrical hazards. Plastic is also easier to manufacture.

Implement 9 has a proximal end 12 with a central, axial bore 12*a* that runs along the major axis of the elongated implement 9. Bore 12*a* can be threaded, as described in greater detail hereinbelow. Part of the body of implement 9 is a flat portion 11, suitable for imprinting words or designs. At the distal end 14 of implement 9 is disposed a U-shaped feature, comprising a left and right finger, 16*a* and 16*b*, respectively.

Figure 2:
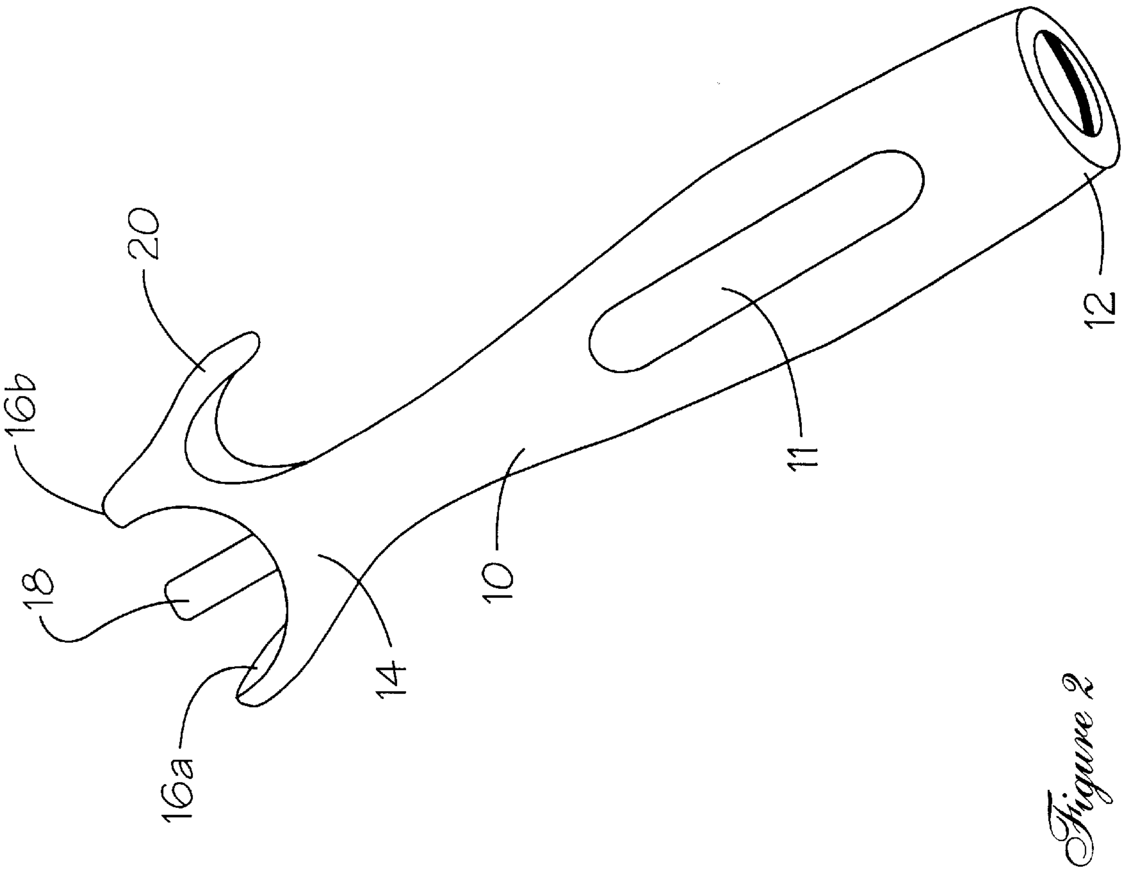
FIG. 2 is a perspective view of a second embodiment of the article shown in FIG. 1 with the addition of a dividing post and finger.

Referring now to FIG. 2, there is shown an alternate embodiment of the implement 9 shown in FIG. 1. In this embodiment, a dividing post 18 is disposed axially with respect to the implement 10 and between the left and right fingers 16*a* and 16*b* of the distal end 14 of the implement 10. dividing post 18 can be affixed by conventional means (e.g. adhesives, welding, mechanical mating, etc.) or can be formed integrally therewith. Dividing post 18 is shown extending to the extremity of both fingers 16*a* and 16*b*, but it should be understood that the length of post 18 need not be limited to the dimensions of the fingers 16*a* and 16*b*.

Also shown in this embodiment is a curved, or hooked proximally oriented finger 20, that can provide a means for hooking or pulling an object.

Figure 3:
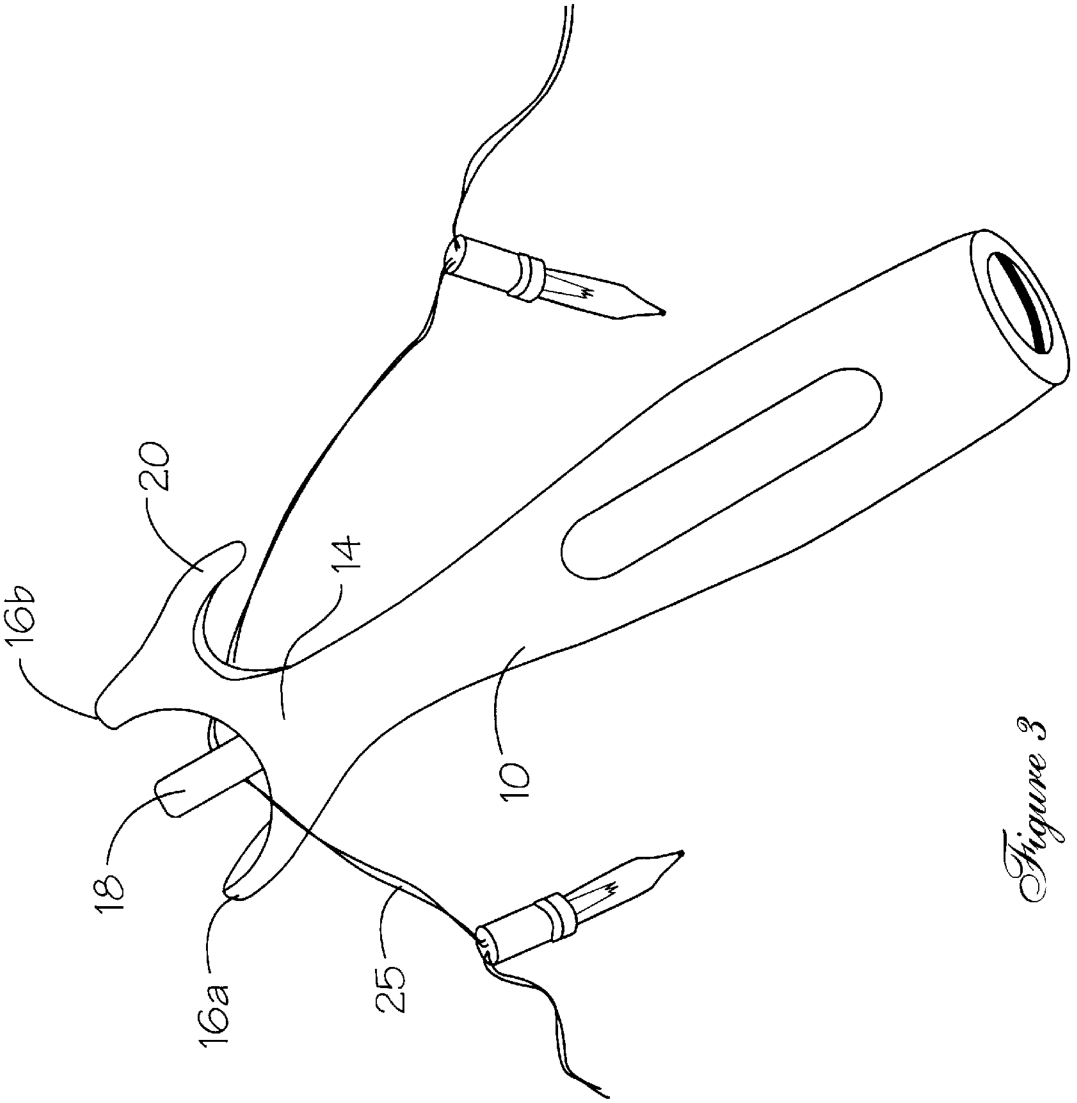
FIG. 3 is a perspective view of the article of the present invention shown in situ with a segment of electric holiday light strand in operative relationship thereto.

Referring now to FIG. 3, there is shown a perspective view of the article 10 of the present invention, shown in situ with a segment of electric holiday light strand 25 in operative relationship thereto. The segment of holiday light strand 25 is represented as being positioned between finger 16*a* and dividing post 18. Alternatively, the segment of holiday light strand 25 may be positioned between the dividing post 18 and finger 16*b*.

Figure 4:
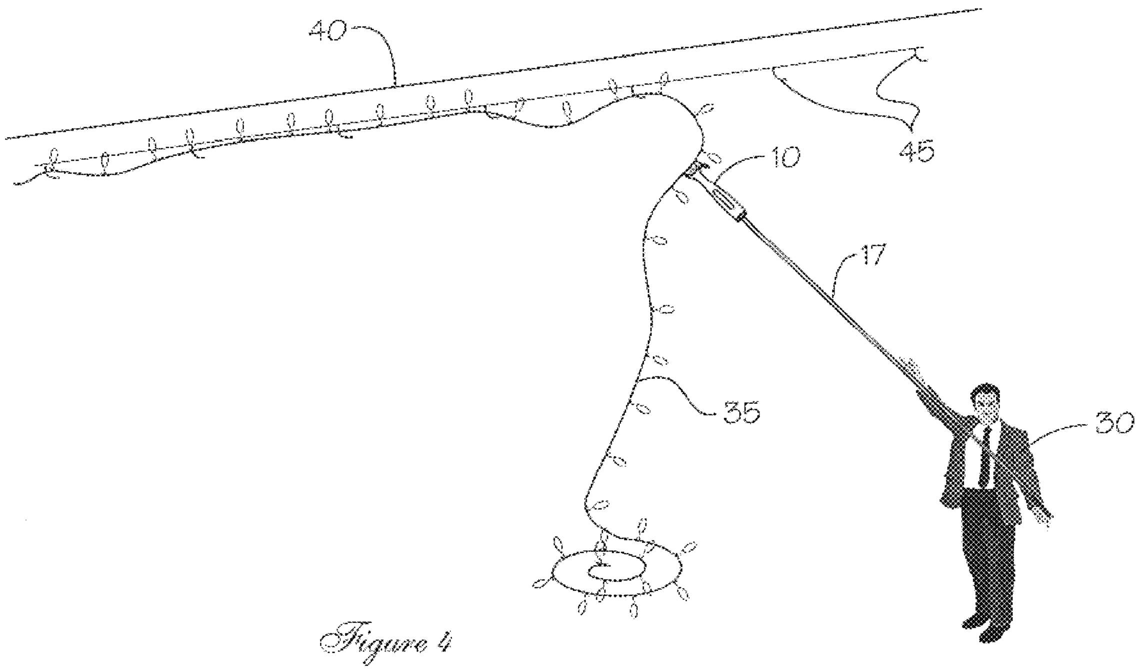
FIG. 4 is a schematic representation of a user stringing or affixing a light strand onto a plurality of hooks attached to a solid, elevated structure such as a beam, gutter or building facade.

Referring now to FIG. 4, there is shown a person 30 using the positioning implement 10 with an optional extension pole 17 to affix a strand of lights 35 to a relatively remote and elevated place 40, such as a beam, gutter or the facade of a building. Threads not shown at the distal end of pole 17 are used to firmly attach the pole 17 to the positioning implement 10. Pole 17 can be a telescoping pole as is known in the art. A plurality of removable or fixed hooks 45 can receive the strand of lights 35 which may be placed by the positioning implement 10.

Figure 5:
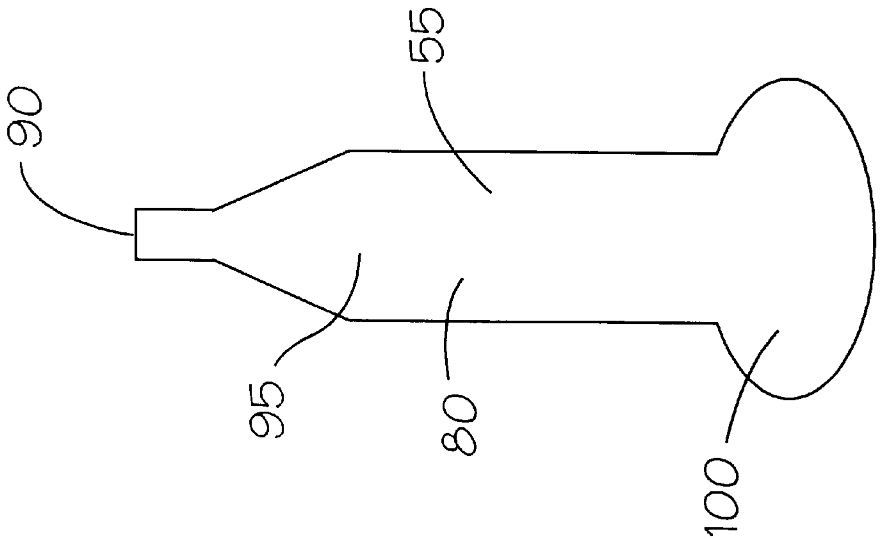
FIG. 5 is a rear, plan view of a hanger in accordance with the present invention.

Referring now to FIG. 5, there is shown a rear view of a temporary removable hanger 80, the back portion 55 having two sections: a relatively elongated section 95 and a relatively wide section 100. Also shown is the beam 90 of the hanger 80.

Figure 6:
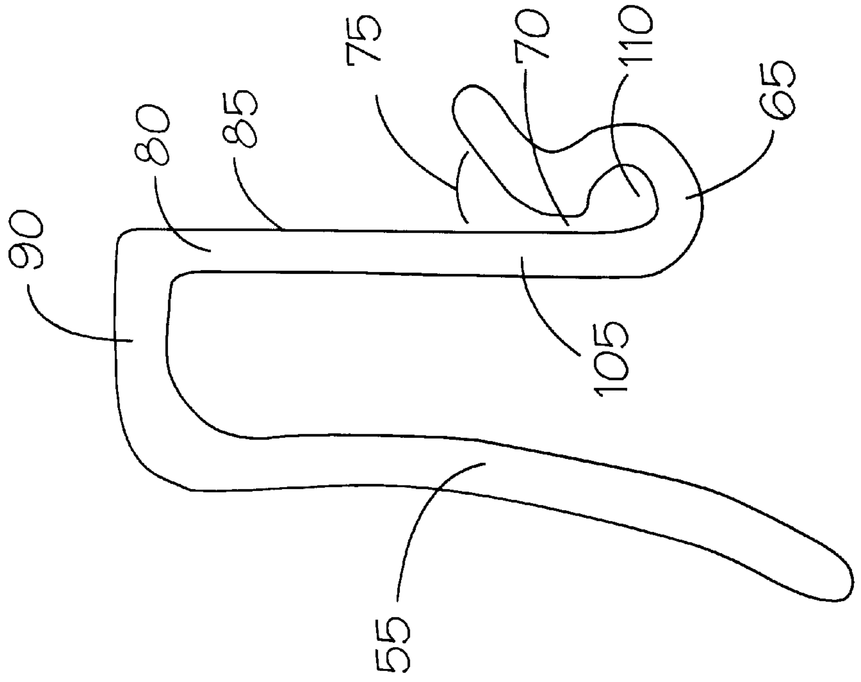
FIG. 6 is a side view of the hanger shown in FIG. 5.

Referring now to FIG. 6, there is shown a side view of the temporary hook or hanger 80. The item 80 has an inverted substantially U-shape or J-shape comprising three sections: back portion 55, beam 90 and front portion 85. The beam 90 connects the back portion 55 to the front portion 85. The back portion 55 is relatively longer than the front portion 85.

The front portion 85 comprises an elongated section 105 and a secondary hook section 65. The elongated section 105 and back section 55 are coplanar. Section 105 connects section 90 with the secondary hook section 65. The secondary hook section 65 comprises three parts: a holder section 110, a gateway section 70, and a mouth section 75.

Figure 7:
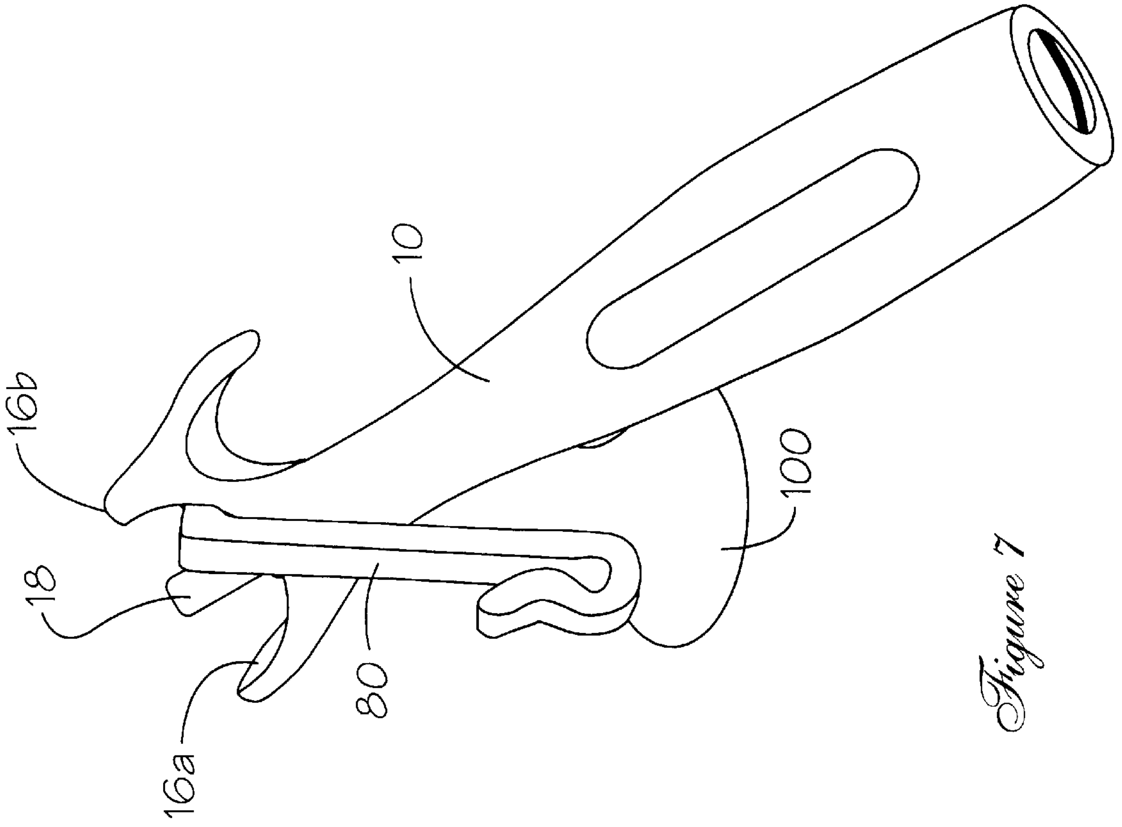
FIG. 7 is a perspective view of the article of the present invention shown in situ with a hanger in juxtaposition with the article.

Referring now to FIG. 7, there is shown a perspective view of the article 10 of the present invention shown in situ with temporary hook or hanger 80 in operative relationship thereto. The temporary hook or hanger 80 positioned between dividing post 18 and finger 16*b* in this figure. Alternatively, the temporary hook or hanger 80 may be positioned between the finger 16*a* and dividing post 18.

Figure 8:
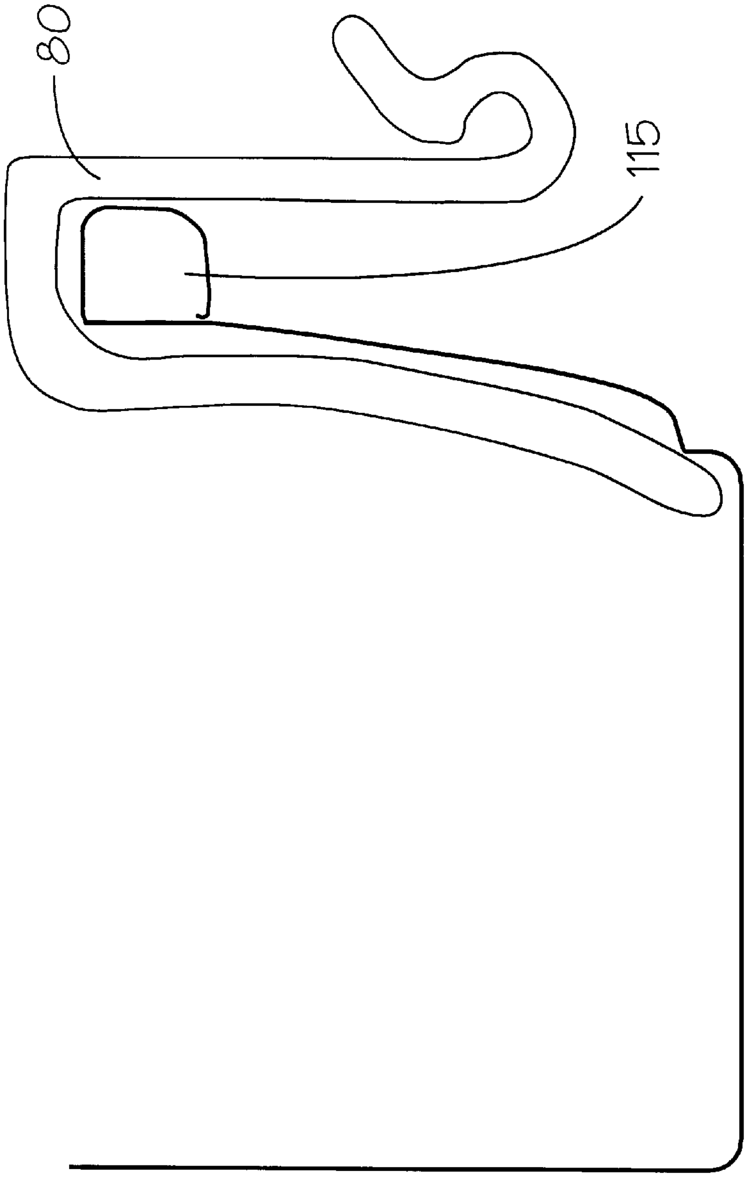
FIG. 8 is a cross-sectional view of the hanger shown in FIGS. 5 and 6, in situ, attached to the gutter of a building.

Referring now to FIG. 8, there is shown a cross-sectional side view a temporary hook or hanger 80 in its resting position on a fixed object 115. The fixed object 115 is a typical gutter. Alternatively, this fixed object 115 may take the form of any relatively fixed object such as a tree branch, shingle, part of a building or other similar object to which the hanger 80 may be affixed.

In operation, the hanger 80 is placed on the end of the positioning implement 10 and oriented correctly so that the beam 90 is between post 18 and adjacent finger 16*a* or 16*b,* whichever is above the dividing post 18. The positioning implement 10 is used to raise the hanger 80 above the fixed object 115, such as a branch or a gutter, upon which the hanger 80 will rest. The hanger 80 is then lowered onto the fixed object 115 with a downward and forward motion that transfers the hanger 80 from the positioning implement 10 to the fixed object 115. The secondary hook section 65 of the hanger 80 is now oriented so that a person 30 can use the positioning implement 10 to hang an object 35 from the hook portion 65 of the hanger 80. A wire light strand 35, or other item to be hung, is placed in the U-shaped feature of the distal end 14 of the positioning device 10.

The positioning device 10 is used to ferry the wire 35 to the exposed mouth section 75 of the hanger. The wire 35 is then moved downwardly by pulling directly on the wire 35, or by using the positioning device 10 to pull on the wire 35. This action pulls the wire 35 past the gateway section 70 of the secondary hook section 65 of hanger 80 and into the holder section 110 of the secondary hook section 65.

Removal of both the wire 35 and hangers 80 is achieved by simply using the positioning implement 10 to lift the wire 35 above the fixed object 115. Since the wire 35 and hanger 80 have been connected by means of snugging the wire 35 into the hook section 65 of the hanger 80, raising the wire 35 automatically lifts the hanger 80 off of the fixed object 115. Also, since the hanger 80 has been attached to the wire 35, it is prevented from being lost or falling into the gutter 115.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for hanging and detaching ornaments, lights, implements, and decorative paraphernalia, at a remote distance, comprising: an elongated pole having a hanging and detaching tool attachable to a distal end thereof, and remotely situated from an operator of said apparatus, said hanging and detaching tool comprising an elongated, substantially cylindrical member having an upwardly facing, U-shaped portion disposed on its outer distal end, said upwardly facing, U-shaped portion comprising spaced-apart, first and second fingers, said second finger including a downwardly facing hook portion, a dividing post extending from said hanging and detaching tool, and disposed between said first and second fingers of said upwardly facing U-shaped portion, said dividing post being operative to engage and manipulate implements, paraphernalia, and strings of lights between said first and second fingers in a facile manner, so that they can be correctly positioned about a remote location.

2. The apparatus for hanging and detaching ornaments, lights, implements, and decorative paraphernalia at a remote distance in accordance with claim 1, wherein said hanging and detaching tool comprises a name plate.

3. The apparatus for hanging and detaching ornaments, lights, implements, and decorative paraphernalia at a remote distance in accordance with claim 1, wherein said dividing post extends beyond said first and second fingers of said U-shaped portion of said hanging and detaching tool.

4. The apparatus for hanging and detaching ornaments, lights, implements, and decorative paraphernalia, at a remote distance in accordance with claim 1, further comprising an inverted U-shaped hanger detachably connected to said elongated, substantially cylindrical member, comprising:

a) a front section being substantially vertically oriented and having a secondary hook section attached to the distal end thereof; and b) a back section being substantially vertically oriented and spaced-apart from, and oppositely disposed with respect to, said front section, the length of said back section being greater than the length of said front section;

whereby said back section provides stability to said hanger when said hanger is disposed over an object having a narrow section.

5. The apparatus for hanging and detaching ornaments, lights, implements, and decorative paraphernalia, at a remote distance in accordance with claim 4, wherein said back section of said hanger comprises a generally massive structure for positioning and retaining said hanger in its rest position by means of gravity.

6. The apparatus for hanging and detaching ornaments, lights, implements, and decorative paraphernalia, at a remote distance in accordance with claim 5, wherein one of said sections of said hanger is relatively wide with respect to the width of the other of said sections for preventing twisting of said hanger during installation and operation thereof.

7. The apparatus for hanging and detaching ornaments, lights, implements, and decorative paraphernalia, at a remote distance in accordance with claim 4, wherein said secondary hook comprises a rounded section for receiving a strand of lights or a hanger or hook of an ornament and a constrictive gateway proximate said rounded section for restraining and securing said strand of lights or said hanger or hook of said ornament.

8. The apparatus for hanging and detaching ornaments, lights, implements, and decorative paraphernalia, at a remote distance in accordance with claim 7, wherein said secondary hook further comprises a mouth proximate said constrictive gateway for directing said strand of lights or said hanger or hook of said ornament to said rounded section of said secondary hook.

* * * * *